(12) United States Patent
Schoenfelder (10) Patent No.: US 12,503,349 B2
(45) Date of Patent: Dec. 23, 2025

(54) DEVICE FOR HOLDING A CONTAINER, AND CLOSING DEVICE

(71) Applicant: KRONES AG, Neutraubling (DE)

(72) Inventor: Markus Schoenfelder, Neutraubling (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 18/759,255

(22) Filed: Jun. 28, 2024

(65) Prior Publication Data

US 2025/0002315 A1     Jan. 2, 2025

(30) Foreign Application Priority Data

Jun. 29, 2023   (DE) ...................... 10 2023 117 271.9

(51) Int. Cl.
*B67B 3/20*     (2006.01)
*B67B 3/22*     (2006.01)

(52) U.S. Cl.
CPC .............. *B67B 3/2013* (2013.01); *B67B 3/22* (2013.01)

(58) Field of Classification Search
CPC ..... B65G 47/847; B67B 3/2066; B67B 3/242; B67B 3/20; B67B 3/206
See application file for complete search history.

(56) References Cited

U.S. PATENT DOCUMENTS

| | | | | |
|---|---|---|---|---|
| 6,073,667 | A * | 6/2000 | Graffin | G01G 3/1402 177/229 |
| 8,556,062 | B2 * | 10/2013 | Stoiber | B67C 3/242 198/470.1 |
| 10,399,836 | B2 * | 9/2019 | Landler | B67B 3/20 |
| 11,136,231 | B2 * | 10/2021 | Schoenfelder | B67C 7/004 |
| 11,772,949 | B2 * | 10/2023 | Landler | B67B 3/20 53/317 |
| 12,138,760 | B2 * | 11/2024 | Ehrismann | B65G 47/90 |
| 12,252,383 | B2 * | 3/2025 | Scaglione | B67B 3/20 |

(Continued)

FOREIGN PATENT DOCUMENTS

| | | |
|---|---|---|
| CN | 113 371 658 A | 9/2021 |
| DE | 10 2014 105 907 | 10/2015 |

(Continued)

OTHER PUBLICATIONS

Search Report dated Nov. 29, 2024, from European Patent Application No. 24 185 617.8, 9 pages.

*Primary Examiner* — Andrew M Tecco
(74) *Attorney, Agent, or Firm* — Haynes and Boone, LLP (57) ABSTRACT

A device for holding a container in a container handling device, for example for holding a bottle without a support ring while a screw closure or a press-on closure is applied, including a carrier and a first holding arm and a second holding arm, which are arranged on the carrier and are configured to hold the container, wherein the first holding arm and the second holding arm are arranged on the carrier in such a way that they can be moved between an open position for receiving and releasing the container and a closed position for holding the container, wherein, for movement between the closed position and the open position, the first holding arm and the second holding arm can each be pivoted about a pivoting axis and rotated about a rotation axis oriented transversely to the pivoting axis.

19 Claims, 5 Drawing Sheets

(56) References Cited

U.S. PATENT DOCUMENTS

| | | | | |
|---|---|---|---|---|
| 2007/0261369 A1* | 11/2007 | Takahara | ................ | B67B 3/206 |
| | | | | 53/317 |
| 2011/0064555 A1* | 3/2011 | Stoiber | ................ | B65G 47/847 |
| | | | | 414/751.1 |
| 2012/0085068 A1* | 4/2012 | Cirio | ......................... | B67B 3/18 |
| | | | | 53/317 |
| 2015/0315002 A1* | 11/2015 | Landler | ................... | B65B 61/28 |
| | | | | 53/317 |
| 2019/0071296 A1* | 3/2019 | Schoenfelder | ........ | B67B 3/2013 |
| 2020/0369503 A1* | 11/2020 | Landler | ................ | B67B 3/2033 |
| 2021/0379733 A1* | 12/2021 | Ehrismann | ................ | B67B 3/00 |
| 2023/0211992 A1* | 7/2023 | Scaglione | ................ | B67C 3/242 |
| | | | | 53/329 |

FOREIGN PATENT DOCUMENTS

| | | |
|---|---|---|
| DE | 10 2019 113 653 | 11/2020 |
| EP | 3 753 900 A1 | 12/2020 |
| WO | 2009068633 | 6/2009 |

\* cited by examiner

DEVICE FOR HOLDING A CONTAINER, AND CLOSING DEVICE

CROSS-REFERENCE TO RELATED APPLICATIONS

This application claims priority from German Patent Application No. DE 10 2023 117 271.9, filed on Jun. 29, 2023 in the German Patent and Trademark Office, the disclosure of which is incorporated herein by reference in its entirety.

BACKGROUND

Technical Field

The present invention relates to a device for holding a container in a container handling device, e.g. for holding a bottle without a support ring in order to apply a screw closure or a press-on closure. The invention furthermore relates to a closing device for closing a filled container with a container closure, e.g. a bottle without a support ring with a screw closure or with a press-on closure.

Related Art

In beverage filling plants, there is a known practice of closing the container filled with the respective filling product by means of a screw closure or a press-on closure, for example. Here, the screw closure is lowered from above onto the container to be closed by means of a closing head while being rotated. During this process, the threads of the screw closure come into contact with the complementary threads in the mouth region of the container, and the application of the rotary motion ensures that the screw closure is screwed into the closed position.

Screw closures can be provided with what is referred to as a "tamper-evident band", which is typically connected by thin material bridges to the actual screw closure and which is configured in such a way that, when the screw closure is first opened, it tears away from the actual screw closure, or partially tears away and partially remains connected to the closure, e.g. inter alia via one or more tethers, as in the case of "tethered caps" according to EU Directive 2019/904. In this way, it is possible for a consumer to determine whether the beverage container purchased by them is intact or whether it has already been opened once. To this end, the tamper-evident band interacts with a retaining ring of the container, wherein the tamper-evident band extends across the retaining ring in the direction of the bottom of the container and, in this arrangement, the material bridges are located substantially at the level of the retaining ring.

In conventional beverage filling plants, containers which are to be closed by means of a screw closure have a support ring in the neck region of the container, below the retaining ring. In this case, the container is gripped in the neck region below the support ring, wherein the container rests by means of its support ring on the correspondingly configured gripping device, e.g. a clamp.

In order to counteract the torque which is exerted on the container by screwing on the container closure, the support ring is generally held in a neck guide by means of what is referred to as a "spike plate", wherein the spike plate has upward-pointing studs or spikes, which engage from below in the support ring of the container in order to support the torque applied via the closing head and thereby to make it possible to screw the container closure onto the container. Depending on the configuration of the support ring/region, the spikes can also point upwards and inwards or inwards. An embodiment without spikes is also possible since there are also "screw closures" which are only pressed on, referred to as "press-on closures".

In order to discharge the containers, which are then provided with the screw closure, from the neck guide after the closing process has taken place, and to feed them to downstream production steps, the procedure in conventional beverage filling plants is that the containers are pushed upwards out of the studs of the neck guides via a ramp rail. In this case, the support rings of the containers run onto a fixed ramp rail in order to disengage the support rings from the studs and thus allow transfer of the filled and now closed containers to a subsequent handling station, e.g. via an outfeed star.

The prior art also includes devices in which a spike plate can be moved below the receiver for the support ring, between an engagement position of the studs and an open position, in which the spike plate is pivoted downwards. A device of this kind can be found in WO 2009/068633 A1, for example. To ensure that there is no collision with the container during a movement of the spike plate into the open position, the container has to have a relatively long, substantially cylindrical section of the neck region below its support ring.

A new generation of containers has no support ring. These containers are also referred to as "bottles without a support ring". These bottles without a support ring have only a retaining ring, with which the tamper-evident band of a screw closure can interact in such a way that the tamper-evident function is maintained. The advantage of bottles without a support ring is the saving of material relative to containers with a support ring. Owing to the absence of the support ring, handling by means of a rigid spike plate in this region is no longer possible since the closure and, in particular, the tamper-evident band, surround the retaining ring substantially completely. In other words, the retaining ring is no longer freely accessible when the screw closure has been applied, but is covered by the tamper-evident band. Here, lifting the filled and closed bottles by means of a known, fixed ramp rail can lead to the tamper-evident band, which then comes into contact with the ramp rail, being worn, damaged or even torn off.

Alternatively, a container closure can also be simply pressed on. The term "press-on closures" is then used. There is no rotation of the closing head during the application of these closures; instead, the closure is merely pressed on. It is also possible to provide press-on closures for application to bottles without a support ring.

For handling bottles without a support ring, particularly holding a bottle without a support ring while it is being closed with a container closure, the prior art correspondingly includes devices which comprise a carrier and a holding assembly arranged on this carrier, wherein the holding assembly comprises a collar-shaped supporting projection for supporting the container on a retaining ring of the container. A device of this kind is known from DE 10 2014 105 907 A1, for example. The supporting projection is configured in such a way that it makes contact with the retaining ring of the container from below and radially within the tamper-evident band of the applied container closure and, as a result, can hold the container directly, even when the container closure has been applied. To ensure the raising and lowering of the container relative to the supporting projection, lifting fingers which can be moved parallel to the container axis and by means of which the container can be lifted from the supporting projection are provided. During this process, the lifting fingers come into contact with the tamper-evident strip of the applied container closure.

To enable the handling of such bottles without a support ring, these bottles have a relatively long cylindrical or slightly conical section on their neck region, below the retaining ring, said section enabling the corresponding raising and lowering of the lifting fingers. For reasons associated with saving additional material, the overall visual impression of the container and applied container closure, and improved security of the tamper-evident band against interference from below the container closure, the section of the neck region is significantly shortened in the case of the newer generation of bottles without a support ring. In the case of bottles designed in this way without a support ring, it is no longer possible to provide the travel required for the use of conventional holding assemblies between the supporting projection and the container by raising and lowering it parallel to the container axis since the respective plant components would then strike the shoulder region of the container.

DE 10 2019 113 653 A1 discloses a device for holding a bottle without a support ring in order to apply a screw closure, comprising a carrier and a holding assembly arranged on the carrier and having a supporting projection region of a first holding arm and a supporting projection region of a second holding arm, wherein the first and the second holding arm can each be arranged on the carrier in such a way as to be pivotable relative to one another between an open position and a closed position about pivoting axes situated in a pivoting axis plane extending parallel to a holding plane.

SUMMARY

An improved device for holding a container in a container handling device, for example for holding a bottle without a support ring in order to apply a screw closure or a press-on closure, and an improved container handling device are disclosed herein according to various embodiments.

Accordingly, a device for holding a container in a container handling device, for example for holding a bottle without a support ring in order to apply a screw closure or a press-on closure is proposed, comprising a carrier, and a first holding arm and a second holding arm, arranged on the carrier, for holding the container, wherein the first holding arm and the second holding arm are arranged on the carrier in such a way that they can be moved relative to one another between an open position, in which a container can be fed in and received and similarly released from the device and removed from the device, and a closed position for holding the container.

The first holding arm and the second holding arm can each be pivoted about a pivoting axis between the open position and the closed position and rotated about a rotation axis oriented transversely to the pivoting axis.

In other words, from the open position into the closed position and from the closed position into the open position, the holding arms each perform a predetermined pivoting motion about the respective pivoting axis and a predetermined rotary motion about the rotation axis oriented transversely to the pivoting axis. The movement of the holding arms can take place synchronously or asynchronously. It is also possible for the two holding arms each to move at least in part uniformly and/or at least in part non-uniformly.

In the present case, the term "transversely" or a "transverse orientation of a geometrical axis with respect to some other geometrical axis" is interpreted to mean that the two axes enclose an angle greater than 0 degrees or, in the case of skew axes, one axis encloses an angle greater than 0 degrees with the parallel projection of the other axis onto the first axis, i.e. they are not parallel. The axes can be perpendicular to one another, for example. An oblique arrangement not equal to 90° in all directions is likewise possible.

By virtue of the fact that, between the open position and the closed position, the first holding arm and the second holding arm can each be pivoted about a pivoting axis and about a rotation axis oriented transversely to the pivoting axis and arranged perpendicularly to the holding plane, an enlarged opening angle can be provided relative to devices with holding arms that only pivot. Accordingly, the feeding in and removal of containers is made easier, especially in respect of the precision of infeed. Moreover, the container handling device having the device and devices which feed the containers to the container handling device and remove containers from the container handling device can be of more compact construction, especially in respect of a required pitch circle diameter for transport.

By virtue of the additional rotation of the holding arms, the said holding arms, more specifically a region of the holding arms by means of which they make contact with the container in order to hold it, can be moved further away from one another in the open position than in the case of a pure pivoting motion. Thus, while obtaining a compact construction of the device, it is possible for a support region by means of which the holding arms each come into contact with the container to be made larger than in the case of conventional devices from the prior art. In particular, the support region can be configured to be, beyond the widest region of the container, perpendicular to the conveying direction of the containers, which, in the case of container handling devices of rotary construction, is a radially outward direction in relation to the central axis of rotation of the rotary carousel of the container handling device, for example. The large support region makes it possible to hold the container in a stable manner in the device. In particular, the risk that the mouth of the container will tilt during closure on account of the conveyance of the container, especially in the case of a rotary conveying direction, is low. It is thus possible to reduce or even to entirely avoid closure errors in comparison with conventional devices from the prior art. Accordingly, it is also possible to dispense with an external circumferential guide for the container on the container handling device, which is often necessary in the case of prior art devices and must be provided in the case of conventional devices in order to guide the containers radially on the outside in relation to the central axis of rotation, e.g. on the neck of said containers, and which must support the bottle mouth in order to avoid tilting away of the neck since this leads to closure errors.

The pivoting axis and the rotation axis of each holding arm can have a point of intersection or can be skewed relative to one another.

According to one embodiment, the angle described above between the pivoting axis and the rotation axis or between a parallel projection of the pivoting axis onto the rotation axis and the rotation axis, or vice versa, can be in a range of from 30° to 90°, e.g. 45° to 90°, or 60° to 90°. The pivoting axis and the rotation axis of each holding arm can be arranged perpendicularly to one another.

In the closed position, the holding arms can define a holding plane, and the rotation axis can be arranged perpendicularly to the holding plane.

According to one embodiment, the pivoting axes can be situated in the holding plane or in a pivoting axis plane extending parallel to the holding plane.

In order to allow or enable an improvement in the conveyance of containers without a support ring, the holding arms can each comprise a collar-shaped supporting projection region to form a supporting projection to support the container on a retaining ring of the container.

In other words, according to an optional embodiment, the two supporting projection regions together form a collar-shaped supporting projection for supporting the container on a retaining ring of the container. The supporting projection regions can each extend from their holding arm in such a way that they extend upwards or radially inwards and upwards, ensuring that they engage under the tamper-evident band of the container closure without absorbing any part of the weight of the container via the tamper-evident band. For this purpose, the supporting projection regions can be configured in such a way that, in the closed position, they and the remaining holding arm are at a distance from the tamper-evident band of the container closure applied to the container.

The term "upwards" describes a direction which is oriented counter to the direction of gravity in an envisaged installation position of the device.

When the holding arms surround the supporting projection regions, the supporting projection regions of the holding arms in the closed position can define the holding plane. In the open position, the supporting projection regions can be radially outside the position of the supporting projection regions in the closed position in the direction of view of a reference axis oriented perpendicularly to the holding plane and arranged centrally between the supporting projection regions situated in the closed position, and, in the open position, the supporting projection regions can be at a lower height when viewed in the direction of the reference axis than the supporting projection regions in the closed position.

In other words, when supporting projection regions are present, the holding arms can define the holding plane by way of their supporting projection regions. The supporting projection regions then form the support region of the holding arms.

Like the above-explained term "upwards", the term "lower height" refers to the direction of gravity of the earth. Consequently, "arranged at a lower height" or "situated at a lower height" means closer to the centre of the earth than the reference object or reference position, analogously to a height indication with reference to the average sea level/orthometric height or the standard data plane or vertical datum. It thus describes arrangement below the reference, wherein the objects compared may be offset transversely to the direction of gravity, i.e. are not restricted to parallel displacement in the direction of gravity.

The holding arms, more specifically, where present, the collar-shaped supporting projection regions thereof, can be configured in such a way that a container held by the device is held with its container longitudinal axis perpendicular to the holding plane.

According to one embodiment, the holding plane can be oriented perpendicularly to the direction of gravity, that is to say horizontally, in an envisaged installation position of the device.

According to one embodiment, the device can be configured in such a way that, during movement of the holding arms out of the closed position into the open position, the holding arms undergo only, that is to say exclusively, a rotary motion about the rotation axis in a first motion segment, and, in a further motion segment following the first motion segment, the holding arms undergo a pivoting motion about the pivoting axis or undergo a pivoting motion about the pivoting axis and a further rotary motion about the rotation axis, and vice versa.

Here, the words "vice versa" refer to the movement out of the open position into the closed position in an analogous sequence, that is to say that the device is also correspondingly configured in such a way that, during a movement of the holding arms out of the closed position into the open position, starting with the further motion segment, the holding arms undergo a pivoting motion about the pivoting axis or undergo a pivoting motion about the pivoting axis and a further rotary motion about the rotation axis, and, in the following first motion segment, undergo only, that is to say exclusively, a rotary motion about the rotation axis.

Alternatively, the device can be configured in such a way that, during movement of the holding arms out of the closed position into the open position, the holding arms undergo only a pivoting motion about their pivoting axis in a first motion segment, and, in a further motion segment following the first motion segment, the holding arms undergo a rotary motion about the rotation axis or a rotary motion about the rotation axis and a further pivoting motion about the pivoting axis, and vice versa.

Here, the words "vice versa" once again refer to the movement out of the open position into the closed position in an analogous sequence, that is to say that the device is also correspondingly configured in such a way that, during a movement of the holding arms out of the open position into the closed position, starting with the further motion segment, the holding arms undergo a rotary motion about the rotation axis or undergo a rotary motion about the rotation axis and a further pivoting motion about the pivoting axis, and undergo only, that is to say exclusively, a pivoting motion about their pivoting axis in the following first motion segment.

In order to be able to control the position of the holding arms in a specifically intended manner, it is possible according to one embodiment for the device to comprise an actuator unit for predetermining the position of the holding arms. In this case, the actuator unit can comprise a first actuator part for controlling the pivoting motion of the holding arms about their respective pivoting axis and a second actuator part for controlling the rotary motion of the holding arms about their respective rotation axis. The first actuator part can optionally be controllable separately from the second actuator part.

In order to be able to move the holding arms between the open position and the closed position, the device can comprise a transmission assembly for moving the holding arms. The transmission assembly can be arranged on the carrier and/or in the interior of the carrier, for example. The transmission assembly can be at least partially part of the actuator unit.

The holding arms can each be connected for conjoint rotation to a transmission rod that can be pivoted about the pivoting axis. The transmission rod can have at least one radial lever arm, which is arranged at a predetermined radial distance from the pivoting axis on the transmission rod.

According to one embodiment, the first actuator part can be connected via in each case one connecting rod to in each case one radial arm of the transmission rod, which is connected for conjoint rotation to a holding arm and is pivotable about the pivoting axis of the connected holding arm. It is advantageous if the connecting rod is connected rotatably to the lever arm, e.g. via a rotary joint, which can optionally be embodied as a ball joint. Accordingly, robust and precise control of the pivoting position of the holding arm can be achieved.

Alternatively or in addition, the second actuator part can be connected via in each case one connecting rod to at least one or both transmission rods of the holding arms, e.g. being rotatably connected, for instance via a rotary joint, optionally via a ball joint. Accordingly, robust and precise control of the rotary motion of the holding arm can be achieved.

Moreover, the first actuator part can have a plate-shaped main body, on which at least one guide track for predetermining the angular position of at least one holding arm relative to the pivoting axis assigned to it is arranged.

Alternatively or in addition, the second actuator part can have a plate-shaped main body, on which at least one guide track for predetermining the angular position of at least one holding arm relative to the rotation axis assigned to it is arranged.

If the transmission rods are guided in translation at a distance from their connection to the holding arm on which they are rotatably mounted, e.g. being guided relative to their connection to the holding arm, the rotation axes of the holding arms can be predetermined in a simple and robust way.

The holding arms can be guided in a translation plane that is optionally oriented parallel to the holding plane, wherein the transmission rods can optionally each comprise a sliding block, which can be guided in a guide, e.g. a guide slot.

According to one embodiment, each holding arm can be attached to a first side of a ball element of a ball joint, and the transmission rod can furthermore be attached to the ball element on the second side of the ball element, the opposite side from the holding arm.

According to one embodiment, the device, to be more specific, where present, the actuator unit thereof, can comprise at least one spring element for preloading the holding arms into a predetermined position, e.g. into the closed position or into the open position.

Alternatively or in addition, the actuator unit can comprise at least one spring element for preloading the first actuator part and/or the second actuator part into a predetermined position.

According to one embodiment, the actuator unit can be of pneumatically, hydraulically and/or electrically controllable design, and/or can comprise a control element for interacting with a track-type cam control system and/or a slotted guide and/or a lobed cam control system.

According to one embodiment, the holding arms can be configured in such a way that, in the closed position, the container is supported on the underside of the retaining ring of the container by the collar-shaped supporting projection regions, and/or that, in the closed position, the container is clamped radially by a clamping region of the holding arms, which is oriented in the direction of the container longitudinal axis. The application of the clamping force and the level thereof can be controlled, in particular, by controlling the rotary motion of the lever arms about their rotation axes.

The carrier can comprise a support section, which is provided for supporting the container on the retaining ring of the container or on the tamper-evident band of a container closure applied to the container when the holding arms have been moved into the open position. The support section can optionally be arranged at a predetermined distance below the holding plane predetermined by the holding arms when situated in the closed position, more specifically, where present, the holding plane predetermined by the supporting projection regions, wherein the distance is configured, for example, to be such that, in the closed position of the holding arms, the applied container closure is at a distance from the support section, e.g. at a distance of 0.1 mm to 2 mm, optionally 0.3 mm to 1 mm. Thus, the closed container can be supported by the support section after the release of the container by the holding arms, the latter having been moved into the open position.

The supporting projection regions of the holding arms can optionally have at least one pointed stud for blocking rotation of the container accepted by the holding arms about its container axis, wherein optionally at least one stud points upwards in the closed position, and/or at least one stud points in the direction of the other supporting projection region in the closed position, that is to say points radially inwards in relation to a central longitudinal axis of a container held in the holding arms.

As an option, the pivoting axis plane in which the pivoting axes are optionally located can be arranged above the holding plane predetermined, for example, by the supporting projection regions. Alternatively, the pivoting axis plane can be arranged at the level of the holding plane or can coincide with the latter or, to put it in yet another way, can correspond to it.

A closing device for closing a filled container with a container closure, for example a bottle without a support ring with a screw closure or a press-on closure is also disclosed herein according to various embodiments.

Accordingly, a closing device for closing a filled container with a container closure, for example a bottle without a support ring with a screw closure or a press-on closure, is proposed, comprising a closing member for applying a container closure to a filled container and a device for holding a container according to any one of the preceding embodiments.

BRIEF DESCRIPTION OF THE FIGURES

Further embodiments of the invention are explained in greater detail by the following description of the figures. In the drawings.

DETAILED DESCRIPTION

Exemplary embodiments are described below with reference to the figures. Here, elements in the various figures which are identical, similar or act in the same way are provided with identical reference signs, and in some cases a repeated description of these elements is omitted in order to avoid redundancy.

Figure 1:
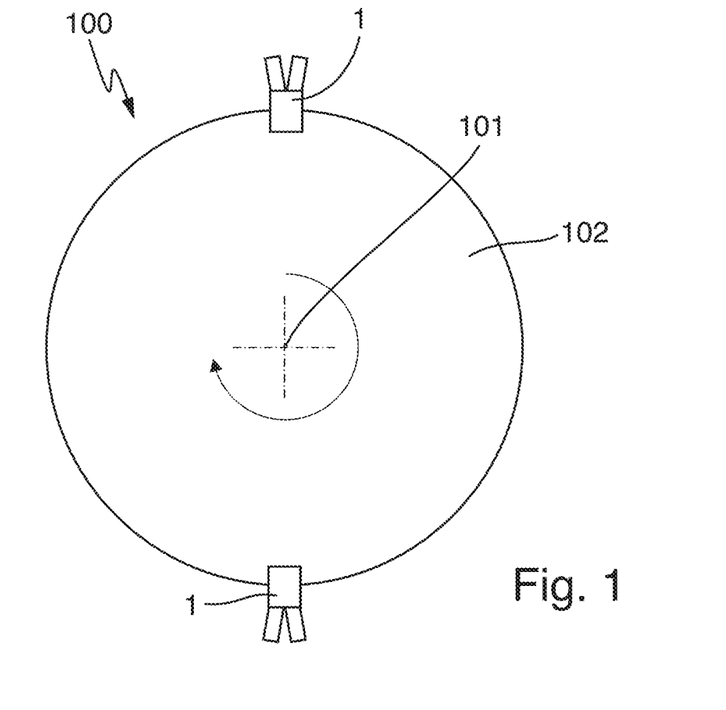
FIG. 1 shows schematically a plan view of a closing device for closing a filled container by means of the container closure.
Figure 2:
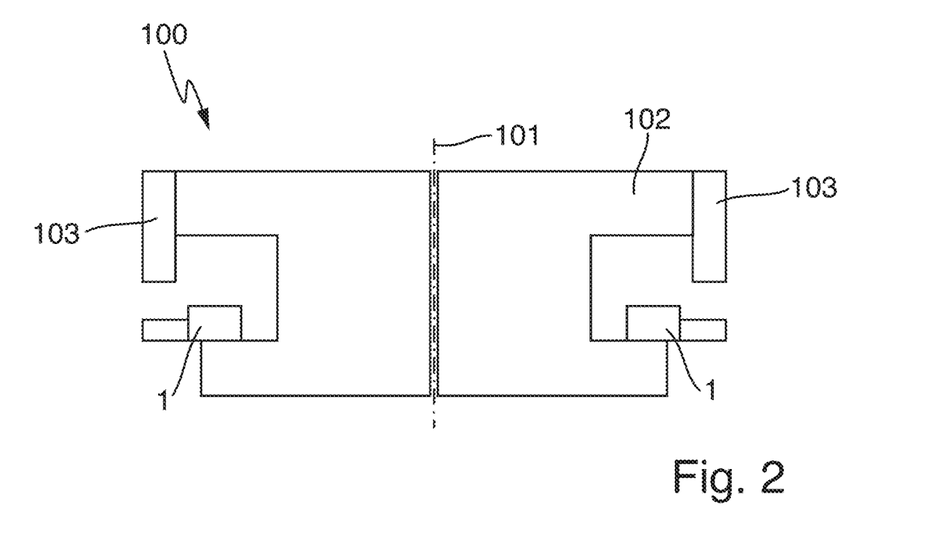
FIG. 2 shows schematically a sectional view through the closing device from FIG. 1.

FIG. 1 shows schematically a plan view of a closing device 100 for closing a filled container with a container closure, in the present case a bottle without a support ring with a screw closure or, alternatively, a press-on closure. FIG. 2 shows schematically a sectional view through the closing device 100 from FIG. 1. The closing device 100 is an example of a container handling device. It is of rotary construction. Accordingly, it comprises a handling carousel 102, which can be rotated about a central axis of rotation 101 and on the circumference of which a plurality of closing members 103 for the application of a container closure to a filled container is arranged in a uniformly distributed manner. Each closing member 103 is assigned a device 1 for holding a container. In each of FIGS. 1 and 2, by way of example, only two of the multiplicity of closing members 103 and devices 1 are shown.

Figure 3:
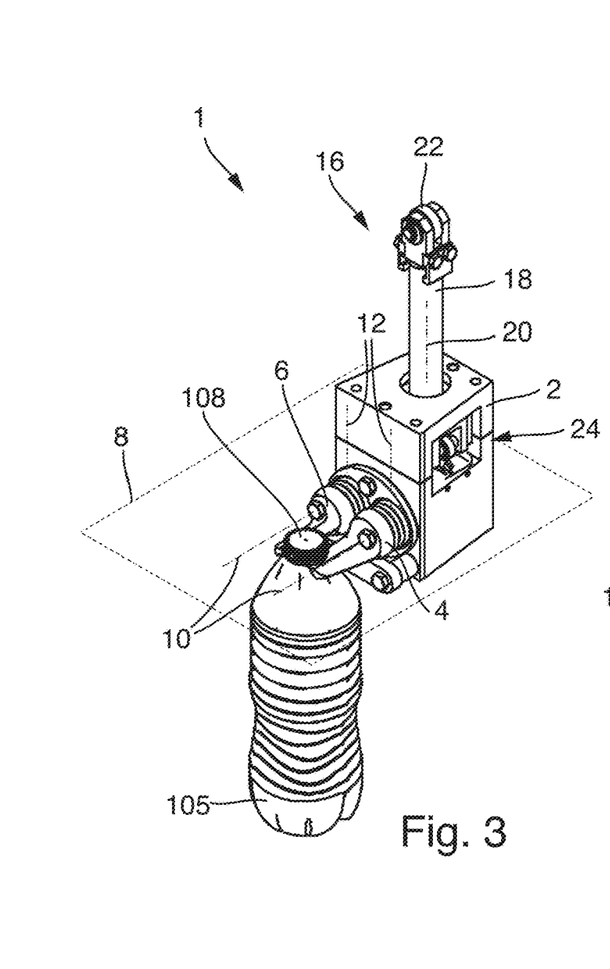
FIG. 3 shows schematically a device, installed in the closing device of FIGS. 1 and 2, for holding a container, wherein the holding arms of the device are in a closed position.
Figure 4:
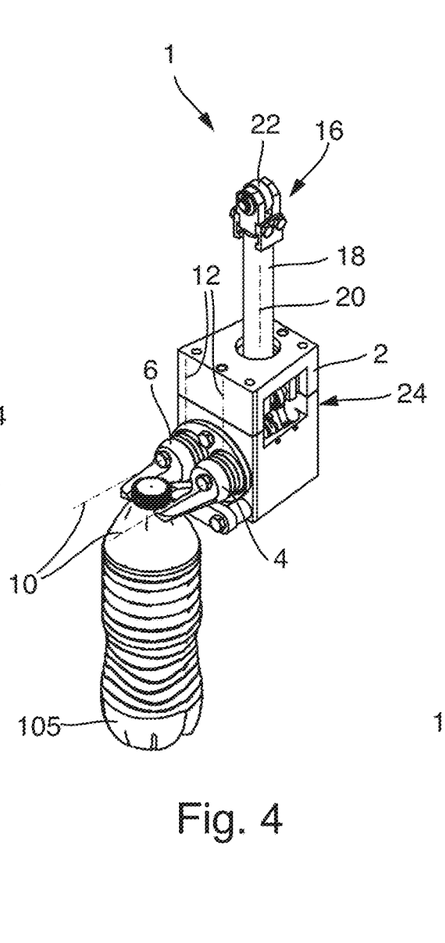
FIG. 4 shows schematically the device from FIG. 3, wherein the holding arms of the device are in an intermediate position.
Figure 5:
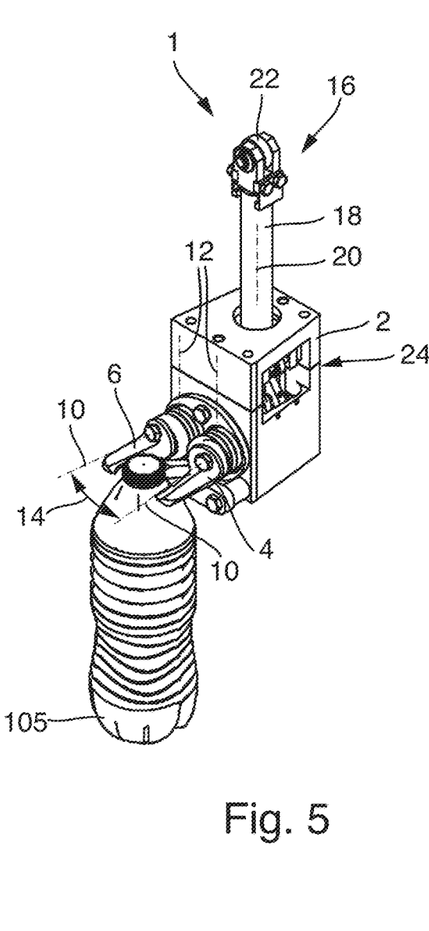
FIG. 5 shows the device from FIGS. 3 and 4, wherein the holding arms of the device are in an open position.

FIGS. 3 to 5 each show schematically a perspective side view of the device 1 for holding a container 105 in the closing device 100 from FIGS. 1 and 2.

The device 1 comprises a carrier 2 and a first holding arm 4 and second holding arm 6, arranged on the carrier 2, for holding the container 105. The first holding arm 4 and the second holding arm 6 are arranged on the carrier 2 in such a way that they can be moved between an open position for receiving and releasing the container 105 and a closed position for holding the container 105.

FIG. 3 shows the device 1 with holding arms 4, 6 in the closed position. FIG. 5 shows the open position of the holding arms 4, 6. FIG. 4 shows a position of the holding arms 4, 6 in a state during the movement of the holding arms 4, 6 from the closed position according to FIG. 3 into the open position according to FIG. 5, which is referred to below as the "intermediate position".

In the closed position, the holding arms 4, 6 define a holding plane 8 on which a retaining ring, to be more precise a lower surface of the retaining ring, of a held container 105 rests in the closed position. According to this embodiment, the holding plane 8 is oriented horizontally, i.e. perpendicular to the direction of gravity.

The first holding arm 4 and the second holding arm 6 can each be pivoted about a pivoting axis 10 between the open position and the closed position and rotated about a rotation axis 12 oriented transversely to the pivoting axis 10 and arranged perpendicularly to the holding plane 8. According to this optional embodiment, the pivoting axis 10 and the rotation axis 12 are oriented orthogonally with respect to one another, and the pivoting axes 10 are oriented parallel to the holding plane 8.

In the closed position of the holding arms 4, 6, which is shown in FIG. 3, the pivoting axes 10 are oriented parallel to one another. As an alternative, however, they can also have some other orientation with respect to one another in the closed position.

The device 1 is configured in such a way that, during movement of the holding arms out of the closed position into the open position, the holding arms 4, 6 undergo exclusively a pivoting motion about their respective pivoting axis 10 in a first motion segment, more specifically by a predetermined pivoting angle. The pivoting angle is optionally predetermined as 30° (=π/6 rad) but can also have some other value, e.g. 10°, 20°, 45° or 60°.

The device can be configured in such a way that the predetermined pivoting angle can be changed, e.g. by means of a modified setting that can be performed in a conversion process.

The first motion segment corresponds to a movement of the holding arms 4, 6 out of the closed position shown in FIG. 3 into the intermediate position shown in FIG. 4.

Following the first motion segment, the holding arms 4, 6 undergo exclusively a rotary motion about their rotation axis 12 in a further motion segment, which corresponds to the movement of the holding arms 4, 6 out of the intermediate position shown in FIG. 4 into the open position shown in FIG. 5.

Conversely, in an analogous sequence according to this optional embodiment, starting from the open position and moving into the closed position, the holding arms 4, 6 undergo exclusively a rotary motion about their rotation axis 12 out of the open position into the intermediate position in the further motion segment, and then undergo exclusively a pivoting motion about their pivoting axis 10 in the subsequent first motion segment.

Alternatively, the holding arms 4, 6 may also undergo exclusively a rotary motion about their rotation axis 12 in the first motion segment, or a combined motion composed of a pivoting motion about their pivoting axis 10 and a rotary motion about their rotation axis 12.

Furthermore, the holding arms 4, 6 may also undergo exclusively a (further) pivoting motion about their pivoting axis 10 in the further motion segment, or a combined motion composed of a (further) pivoting motion about their pivoting axis 10 and a (further) rotary motion about their rotation axis 12.

The angle of the rotary motion is likewise predetermined. In the present case, the predetermined pivoting angle of the holding arms 4, 6 about their pivoting axes 12 is 8° in each case. Since the holding arms 4, 6 are rotated equally in opposite directions, an opening angle 14, enclosed by the holding arms 4, 6, to be more specific by the pivoting axes 10, between the holding arms 4, 6 of 16° is accordingly obtained. Alternatively, it is also possible to predetermine some other pivoting angle, and/or to change or adjust the predetermined pivoting angle.

In order to be able to predetermine the position of the holding arms 4, 6 relative to the carrier 2, the device 1 comprises an actuator unit 16.

According to this embodiment, the actuator unit 16 comprises a control rod 18, which can be moved along a control axis 20. In the installed position of the device 1 in the closing device 100, the control axis 20 is in the present case oriented parallel to the direction of gravity. In the present case, the control axis 20 is oriented parallel to the rotation axes 12. In the present case, the control axis 20 is oriented perpendicularly to the pivoting axes 10. However, it is not limited to the above.

At its upper end in FIGS. 3 to 5, the control rod 18 comprises an interaction element, in the present case configured as a running roller 22, which is configured to roll along a cam guide (not shown here), which is arranged for conjoint rotation on a stationary base frame of the closing device 100.

The actuator unit 16 furthermore comprises a transmission assembly 24, via which the control rod 18 is coupled to the holding arms 4, 6 for the purpose of controlling the pivoting movements and rotary movements of the holding arms 4, 6.

Figure 6:
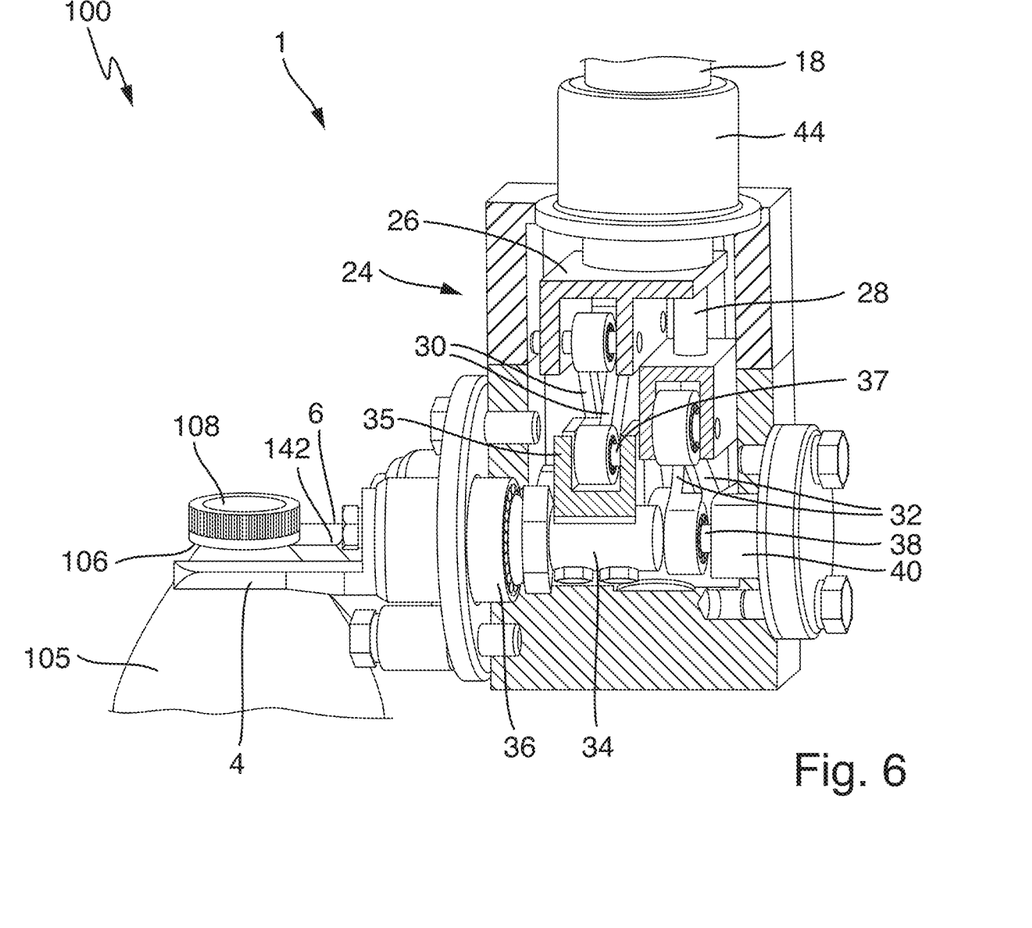
FIG. 6 shows schematically a perspective side view of the device according to FIGS. 3 to 5.

FIG. 6 shows schematically a perspective side view of the device 1 according to FIGS. 1 to 5, wherein the view of the interior of the carrier 2 is exposed since the carrier 2, to be more specific a carrier housing of the carrier 2, is cut open.

The actuator unit 16 comprises a first actuator part 26 for controlling the pivoting motion of the holding arms 4, 6 about their respective pivoting axis 10, and a second actuator part 28 for controlling the rotary motion of the holding arms 4, 6 about their respective rotation axis 12.

The first actuator part 26 is connected via in each case one first connecting rod 30 to in each case one radial lever arm 35, which is connected, in this case rotatably connected by means of a ball joint 37, at a predetermined distance from the pivoting axis 10 to a transmission rod 34 that is connected for conjoint rotation to in each case one holding arm 4, 6 and can be pivoted about the pivoting axis 10 of the connected holding arm 4, 6. The second actuator part 28 is connected via in each case one second connecting rod 32 to in each case one of the transmission rods 34, in the present case being rotatably connected via a ball joint 38.

At their holding-arm end, the transmission rods 34 are connected for conjoint rotation, in each case via a ball joint 36, to one of the holding arms 4, 6.

At their end opposite the holding-arm end, they are guided in translation in a translation plane oriented parallel to the holding plane 8 according to this embodiment for example, via a sliding block 41 in a guide groove of a sliding block guide 40 arranged on the carrier 2. The translation plane is the product of the direction of the translational guidance of the sliding blocks 41 in the sliding block guide 40 and the centre of rotation of the ball joint 36.

Also arranged on the carrier 2 is a support section 42 for supporting the container 105 on the retaining ring or on the tamper-evident band 106 of an applied container closure 108 when the holding arms 4, 6 have been moved into the open position. The support section 42 can be arranged at a predetermined distance below the holding plane 8 defined by the holding arms 4, 6 situated in the closed position, wherein, for example, the distance is configured to be such that, in the closed position of the holding arms 4, 6, the applied container closure 108 is spaced apart from the support section 42, in the present case optionally at a distance of 0.1 to 2 mm, e.g. 0.3 to 1 mm. Here, the distance is 0.6 mm.

The control rod 18 is sealed off relative to the carrier 2 by means of a diaphragm seal 44.

The device 1 shown in FIGS. 3 to 5 is configured to be of hermetically sealed construction with the sealing diaphragm seal at the top and further diaphragm seals on the holding arms 4. Alternatively, however, the device 1 can also be configured to be of open construction.

Figure 7:
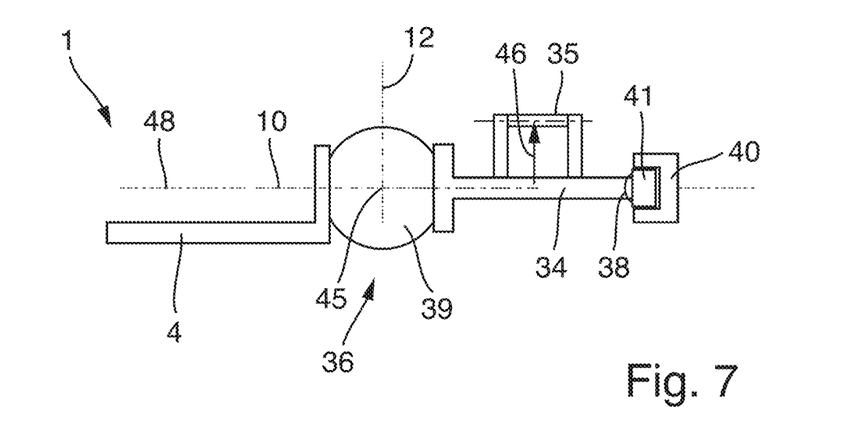
FIG. 7 shows schematically a side view of a holding arm, more specifically a holding arm assembly of the holding arm of the device from FIGS. 3 to 6.

FIG. 7 shows schematically a side view of the holding arm 4, more specifically a holding arm assembly of the holding arm 4 from FIGS. 1 to 6.

As already mentioned, the holding arm 4 is attached to one side of the ball joint 36, more specifically of a ball element 39 of the ball joint 36, and, on the opposite side of the ball joint 36, more specifically of the ball element 39 of the ball joint 36, the transmission rod 34 is attached to the ball element 39. The ball joint 36 provides the pivoting axis 10 and the rotation axis 12 or forms these, the said axes intersecting each other at the centre of rotation 45 of the ball joint 36.

It can furthermore be seen that the lever arm 35 is arranged at a predetermined radial distance 46 relative to the pivoting axis 10.

Moreover, the guidance of the transmission rod 34 via its sliding block 41 in the sliding block guide 40 is illustrated. The orientation of the guidance, i.e. the direction of guidance, in the sliding block guide 40 extends perpendicularly to the plane of FIG. 7. It extends perpendicularly to the rotation axis 12. It extends perpendicularly to the direction of gravity.

The centre of rotation 45 and the direction of guidance define a rotation plane 48, to which the rotation axis 12 of the holding are 4 is perpendicular.

In FIG. 6, the holding arms 4, 6 of the device 1 are in the open position shown in FIG. 5.

The first actuator part 26 and the second actuator part 28 are coupled to the control rod 18 in such a way that, when the control rod 18 is moved downwards out of the position shown in FIG. 6, i.e. towards the holding arms 4, 6 and the transmission rods 34, it is initially only the second actuator part 28 which undergoes a movement in the direction of the control axis 20 towards the transmission rods 34. As a result, the holding arms 4, 6 rotate inwards, i.e. towards one another, about their respective rotation axis 12. This corresponds to the further motion segment described above. After the control rod 18 has travelled a stroke assigned to the further motion segment in the direction of the transmission rods 34, the holding arms 4, 6 are in the intermediate position shown in FIG. 4.

The first actuator part 26 and the second actuator part 28 are furthermore coupled to the control rod 18 in such a way that, after the stroke of the control rod 18 assigned to the further motion segment has been reached or exceeded, that is to say from the intermediate position, only the first actuator part 26 undergoes movement in the direction of the control axis 20 towards the transmission rods 34. As a result, the holding arms 4, 6 pivot inwards and upwards into the closed position about their respective pivoting axis 10. This corresponds to the first motion segment described above.

In order to enable their movements as described above, the actuator parts 26, 28 are each movable within a predetermined travel relative to the control rod 18.

The second actuator part 28 is preloaded against the control rod 18 by a spring (not shown here) and can be moved towards the transmission rods 34 up to a stop (not shown here) arranged on the carrier 2. After contact with the stop, the spring undergoes compression between the control rod 18 and the second actuator part 28.

The first actuator part 26 is preloaded relative to the carrier 2 by a spring (not shown here). In the further motion segment, the control rod 18 moves freely relative to the first actuator part 26, and the latter therefore remains unchanged in its position. In the intermediate position, no contact occurs between a stop (not shown here), arranged on the control rod 18, and the first actuator part 26. In the first motion segment, the first actuator part 26 is then pushed towards the transmission rods 34 via the stop of the control rod 18, and the spring is correspondingly compressed between the first actuator part 26 and the carrier 2. Owing to the movement of the first actuator part 26 towards the transmission rods 34, the holding arms 4, 6 undergo their pivoting motion via their respective pivoting axis 10.

Figure 8:
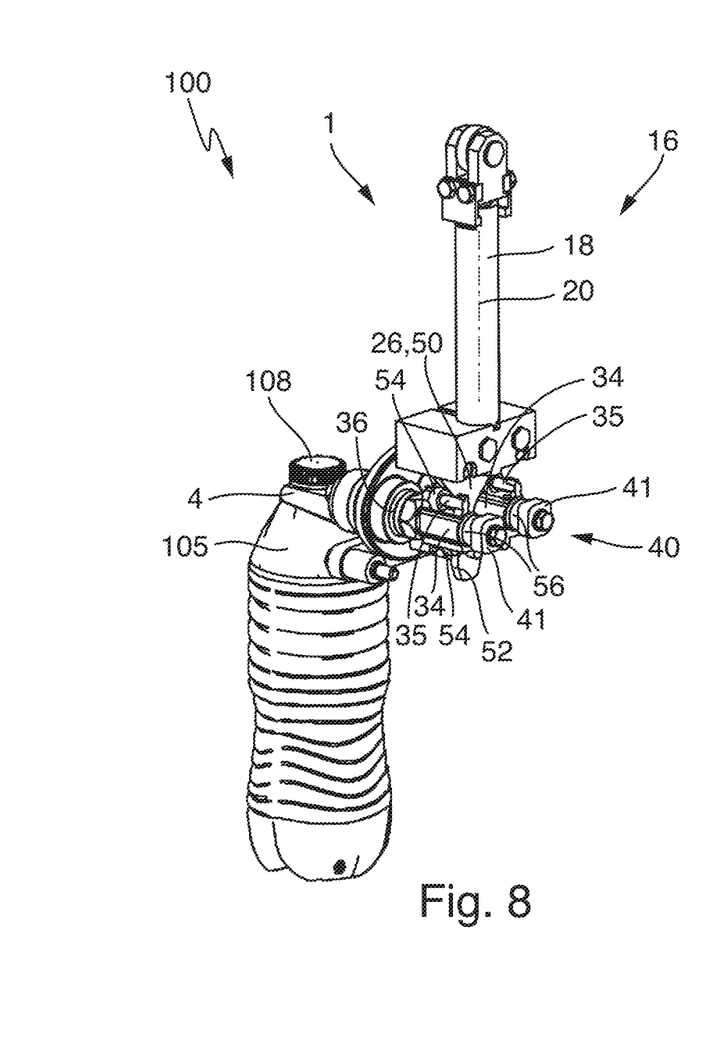
FIG. 8 shows schematically a perspective side view of another device for holding a container in a container handling device.

FIG. 8 shows schematically a device 1 for holding a container 105 in a container handling device, e.g. for holding a bottle without a support ring in order to apply a screw closure or a press-on closure, according to another embodiment, which can be used, for example, instead of the device 1 from FIGS. 3 to 6 in the closing device 100 according to FIGS. 1 and 2.

The device from FIG. 8 corresponds substantially to that from FIGS. 3 to 6, but differs only in the construction of the actuator unit 16 and of the coupling to the holding arms 4, 6, i.e. the transmission assembly.

Instead of the connection of the two actuator parts 26, 28 via connecting rods, as described with respect to FIGS. 6 and 7, the actuator unit 16 of the device 1 from FIG. 8 comprises actuator parts 26, 28 which are of plate-shaped design.

The actuator parts 26, 28 are firmly connected to the control rod 18. They comprise guide cams described in greater detail below, via which the pivoting motion and the rotary motion of the holding arms 4, 6 are predetermined.

In FIG. 8, the carrier 2 and the sliding block guide 40, which are of substantially identical design to those shown in FIGS. 3 to 6, and the plate-shaped second actuator part 28 are omitted in order to open up the view towards the plate-shaped first actuator part 26 to enable its mode of operation to be illustrated.

Figure 9:
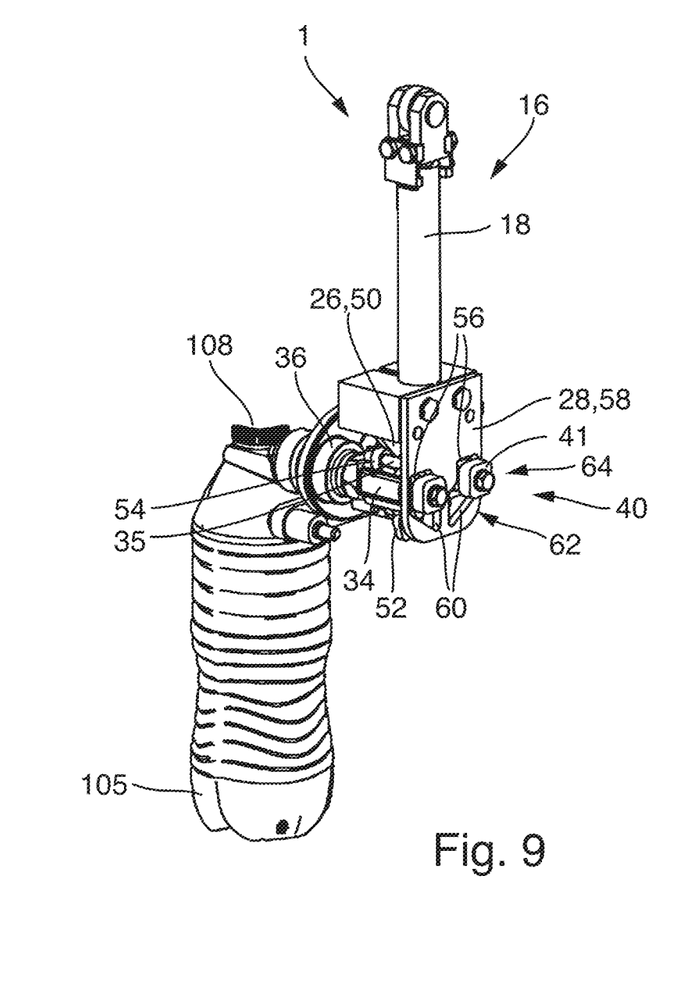
FIG. 9 shows schematically another perspective side view of the device from FIG. 8.

FIG. 9 shows schematically another perspective side view of the device 1 from FIG. 8, in which the second actuator part 28 is inserted to enable its mode of operation to be illustrated.

As can be seen from FIG. 8, the first actuator part 26 comprises a plate-shaped main body 50, on opposite sides of which guide tracks 52 are formed. Guide blocks 54 arranged on the lever arms 35 rest against the guide tracks 52 and, during a movement of the control rod 18 and thus of the first actuator part 26 in the direction of the control axis 20 relative to the transmission rods 34, they slide over their associated guide track 52.

As can be seen from FIG. 9, the second actuator part 28 comprises a plate-shaped main body 58, in which there are slot-type guide tracks 60. Guide blocks 56 arranged on the transmission rods 34 are guided on the guide tracks 60.

In this embodiment too, the mounting of the transmission rods 34 relative to the carrier 2 and the attachment thereof to the holding arms 4, 6 corresponds to the design according to FIG. 7.

In FIGS. 8 and 9, the holding arms 4, 6 are positioned in the closed position.

Owing to the surfaces of the guide tracks 52 of the first actuator part 26 being oblique with respect to the control axis 20, the holding arms 4, 6 undergo a successive pivoting motion during a movement of the control rod 18 out of the position shown in FIGS. 8 and 9 into the closed position. Consequently, the holding arms 4, 6 undergo a pivoting motion in the first motion segment and a further pivoting motion in the further motion segment.

As can be seen from FIG. 9, the guide tracks 60 of the second actuator part 28 comprise a section 62 oriented obliquely to the control axis 20 and an adjoining section 64 oriented parallel to the control axis 20.

During actuation of the control rod 18, i.e. movement of the actuator unit 16 towards the holding arms 4, 6, the guide blocks 56 initially slide parallel to the control axis 20 or to the section 64 oriented parallel to the rotation axis 12. The angular position of the guide blocks 56 and, as a result, also of the sliding blocks 41 relative to the rotation axes 12 associated with them remains unchanged. Accordingly, the holding arms 4, 6 do not undergo a rotary motion in the first motion segment, which is predetermined by the parallel-oriented section 64.

In the further motion segment, which is predetermined by the obliquely oriented section 62, the guide blocks 56 and thus the sliding blocks 41 undergo a movement towards one another. Accordingly, the holding arms 4, 6 undergo a rotation away from one another about their rotation axes 12 in the further motion segment.

The actuator unit 16 furthermore comprises a spring element (not shown here), which preloads the holding arms 4, 6 into the open position, in the present case by virtue of the fact that the spring element preloads the control rod 18 into the position shown in FIGS. 8 and 9.

Figure 10:
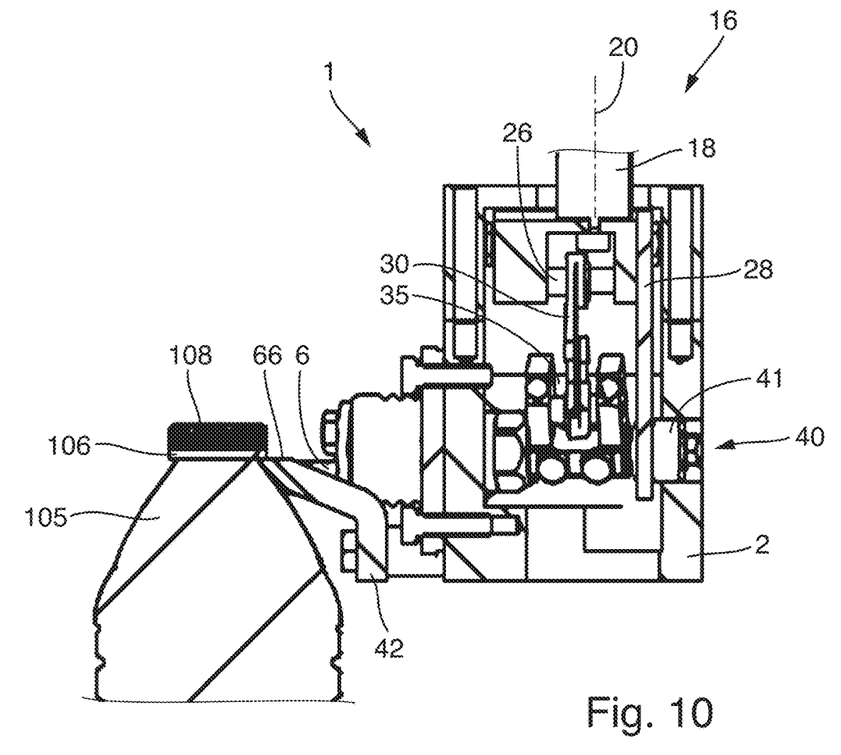
FIG. 10 shows schematically a sectional view through another device for holding a container.

FIG. 10 shows schematically a sectional view through a device 1 for holding a container 105 in a container handling device according to a further embodiment, which can likewise be used in the closing device 100 according to FIGS. 1 and 2. The device 1 corresponds substantially to that from FIG. 6, wherein, instead of the second actuator part 28 attached to the transmission rods 34 via the connecting rods, the actuator unit 16 comprises a plate-shaped second actuator part 28 similar to the embodiment according to FIGS. 8 and 9. In addition, the slot-shaped sliding block guide 40 is provided directly in a wall of the carrier 2, to be more specific of a carrier housing.

Figure 11:
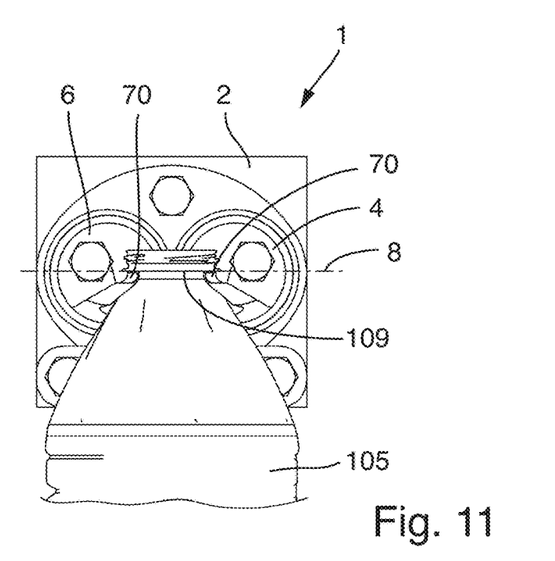
FIG. 11 shows schematically a side view of a partial region of the device from FIGS. 3 to 6.

FIG. 11 shows schematically a side view of a partial region of the device 1 from FIGS. 3 to 6. This side view also corresponds to the side views of the same partial regions of the devices 1 according to FIGS. 8 to 10.

It can be seen that the holding arms 4, 6 according to these optional embodiments each comprise a collar-shaped supporting projection region 70 for supporting the container 105 on a retaining ring 109 of the container 105. Accordingly, the supporting projection regions 70 of the holding arms 4, 6 define the holding plane 8 in the closed position.

The pivoting of the holding arms 4, 6 about their pivoting axes causes the supporting projection regions 70 to pivot outwards and downwards in relation to the container 105. Accordingly, in the open position they are radially outside the position of the supporting projection regions 70 in the closed position in the direction of view of a reference axis oriented perpendicularly to the holding plane 8 and arranged centrally between the supporting projection regions 70 situated in the closed position. In the open position, the supporting projection regions 70 are furthermore at a lower height when viewed in the direction of the reference axis than the supporting projection regions 70 in the closed position.

Where applicable, all the individual features which are illustrated in the exemplary embodiments can be combined with one another and/or interchanged without exceeding the scope of the invention.

What is claimed is:

1. A device for holding a container in a container handling device, comprising:
a carrier;
a first holding arm; and
a second holding arm,
wherein:
the first holding arm and the second holding arm are configured to hold the container,
the first holding arm and the second holding arm are arranged on the carrier so that the first holding arm and the second holding arm are movable between an open position for receiving and releasing the container and a closed position for holding the container, for movement between the closed position and the open position, the first holding arm and the second holding arm are each pivotable about a respective pivoting axis and each rotatable about a respective rotation axis oriented transversely to the respective pivoting axis, during movement of the first holding arm and the second holding arm out of the closed position into the open position, the first holding arm and the second holding arm undergo only a rotary motion about their respective rotation axis in a first motion segment, and in a second motion segment following the first motion segment, the first holding arm and the second holding arm undergo a pivoting motion about their respective pivoting axis, or the first holding arm and the second holding arm undergo a pivoting motion about their respective pivoting axis and a further rotary motion about their respective rotation axis.

2. The device of claim 1, further comprising a transmission assembly configured to move the first holding arm and the second holding arm, wherein the transmission assembly is arranged on and/or in the carrier.

3. The device of claim 1, further comprising an actuator unit configured to predetermine a position of the first holding arm and the second holding arm, wherein the actuator unit comprises a first actuator part configured to control a pivoting motion of the first holding arm and the second holding arm about their respective pivoting axis and a second actuator part configured to control a rotary motion of the first holding arm and the second holding arm about their respective rotation axis.

4. The device of claim 3, wherein the first actuator part is controlled separately from the second actuator part.

5. The device of claim 3, wherein:

the first actuator part comprises a first plate-shaped main body comprising a first guide track configured to predetermine an angular position of at least one of the first holding arm or the second holding arm relative to their respective pivoting axis, and/or the second actuator part comprises a second plate-shaped main body comprising a second guide track configured to predetermine an angular position of at least one of the first holding arm or the second holding arm relative to their respective rotation axis.

6. The device of claim 3, wherein:

the actuator unit comprises at least one spring element configured to preload the first holding arm and the second holding arm into the closed position or into the open position, and/or the actuator unit comprises at least one spring element configured to preload the first actuator part and/or the second actuator part into a predetermined position.

7. The device of claim 3, wherein:

the actuator unit is pneumatically, hydraulically, and/or electrically controllable, and/or the actuator unit comprises a control element configured to interact with a track-type cam control system, a slotted guide, and/or a lobed cam control system.

8. The device of claim 3, wherein the first holding arm and the second holding arm are each connected for conjoint rotation to a transmission rod that is pivotable about their respective pivoting axis, and each transmission rod comprises at least one radial lever arm.

9. The device of claim 8, wherein the first actuator part is connected via a first connecting rod to the at least one radial lever arm of the transmission rod, and the first connecting rod is rotatably connected, connected via a rotary joint, and/or connected via a ball joint to the at least one radial lever arm.

10. The device of claim 8, wherein the second actuator part is connected via a second connecting rod to each transmission rod, and the second connecting rod is connected via a rotary joint and/or a ball joint to each transmission rod.

11. The device of claim 8, wherein each transmission rod is guided in translation at a distance from its connection to the first holding arm or the second holding arm, and each transmission rod comprises a slide block guided in a guide arranged on the carrier.

12. The device of claim 8, wherein each of the first holding arm and the second holding arm is attached to a first side of a ball element of a ball joint, and a respective transmission rod is attached to the ball element on a second side of the ball element, opposite from the first holding arm and the second holding arm.

13. The device of claim 1, wherein:

the first holding arm and the second holding arm each comprise a collar-shaped supporting projection region configured to support the container on a retaining ring of the container in the closed position, and/or the first holding arm and the second holding arm comprise a clamping region that is oriented in a direction of a longitudinal axis of the container.

14. The device of claim 1, further comprising a support section configured to support the container on a retaining ring or on a tamper-evident band of a container closure applied to the container when the first holding arm and the second holding arm have been moved into the open position, wherein:

the support section is arranged on the carrier, the support section is arranged at a predetermined distance below a holding plane defined by the first holding arm and the second holding arm in the closed position, and the predetermined distance is configured to be such that, in the closed position, the container closure is at a distance from the support section of 0.1 mm to 2 mm.

15. The device of claim 1, wherein:

the first holding arm and the second holding arm each comprise a collar-shaped supporting projection region configured to support the container on a retaining ring of the container, the collar-shaped supporting projection regions define a holding plane in the closed position, in the open position, the collar-shaped supporting projection regions are radially outside a position of the collar-shaped supporting projection regions in the closed position in a direction of view of a reference axis oriented perpendicularly to the holding plane and arranged centrally between the collar-shaped supporting projection regions in the closed position, and in the open position, the collar-shaped supporting projection regions are at a lower height when viewed in a direction of the reference axis than the collar-shaped supporting projection regions in the closed position.

16. The device of claim 1, wherein, in the closed position, the first holding arm and the second holding arm define a holding plane, and their respective rotation axis is arranged perpendicularly to the holding plane.

17. A closing device for closing a container with a container closure, comprising:

a closing member configured to apply the container closure to the container; and a device for holding the container in a container handling device, comprising:
- a carrier;
- a first holding arm; and
- a second holding arm, wherein:

the first holding arm and the second holding arm are configured to hold the container, the first holding arm and the second holding arm are arranged on the carrier so that the first holding arm and the second holding arm are movable between an open position for receiving and releasing the container and a closed position for holding the container, for movement between the closed position and the open position, the first holding arm and the second holding arm are each pivotable about a respective pivoting axis and each rotatable about a respective rotation axis oriented transversely to the respective pivoting axis, during movement of the first holding arm and the second holding arm out of the closed position into the open position, the first holding arm and the second holding arm undergo only a rotary motion about their respective rotation axis in a first motion segment, and in a second motion segment following the first motion segment,
- the first holding arm and the second holding arm undergo a pivoting motion about their respective pivoting axis, or
- the first holding arm and the second holding arm undergo a pivoting motion about their respective pivoting axis and a further rotary motion about their respective rotation axis.

18. The closing device of claim 17, wherein the container comprises a bottle comprising a screw closure or a press-on closure.

19. A device for holding a container in a container handling device, comprising:
- a carrier;
- a first holding arm; and
- a second holding arm, wherein:

the first holding arm and the second holding arm are configured to hold the container, the first holding arm and the second holding arm are arranged on the carrier so that the first holding arm and the second holding arm are movable between an open position for receiving and releasing the container and a closed position for holding the container, for movement between the closed position and the open position, the first holding arm and the second holding arm are each pivotable about a respective pivoting axis and each rotatable about a respective rotation axis oriented transversely to the respective pivoting axis, during movement of the first holding arm and the second holding arm out of the closed position into the open position, the first holding arm and the second holding arm undergo only a pivoting motion about their respective pivoting axis in a first motion segment, and in a second motion segment following the first motion segment,
- the first holding arm and the second holding arm undergo a rotary motion about their respective rotation axis, or
- the first holding arm and the second holding arm undergo a rotary motion about their rotation axis and a further pivoting motion about their respective pivoting axis.

* * * * *